United States Patent
Yamamoto et al.

(10) Patent No.: US 6,720,108 B2
(45) Date of Patent: Apr. 13, 2004

(54) SEALING STRUCTURE FOR AN ALKALI BATTERY HAVING A GATE ON AN APERTURE SIDE OF A SEALING ELEMENT

(75) Inventors: Kenji Yamamoto, Neyagawa (JP); Toshikazu Kaneko, Hirakata (JP); Takeshi Okubo, Hirakata (JP); Toshina Saeki, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/735,196
(22) PCT Filed: Jun. 10, 1999
(86) PCT No.: PCT/JP99/03126
§ 371 (c)(1), (2), (4) Date: Dec. 11, 2000
(87) PCT Pub. No.: WO99/65091
PCT Pub. Date: Dec. 16, 1999

(65) Prior Publication Data
US 2001/0007730 A1 Jul. 12, 2001

(51) Int. Cl.[7] .............................................. H01M 2/02
(52) U.S. Cl. ........................ 429/181; 429/184; 429/185
(58) Field of Search ................................ 429/181, 184, 429/185

(56) References Cited

U.S. PATENT DOCUMENTS

| | | | |
|---|---|---|---|
| 4,804,593 A | * | 2/1989 | Hara et al. .................. 429/174 |
| 5,728,484 A | | 3/1998 | Yamaguchi et al. |

FOREIGN PATENT DOCUMENTS

| | | | | |
|---|---|---|---|---|
| EP | 0538039 | | 4/1993 | |
| JP | 60081761 | | 5/1985 | |
| JP | 61118961 | | 6/1986 | |
| JP | 61200665 | | 9/1986 | |
| JP | 05-159759 | | 6/1993 | |
| JP | 08-127047 | * | 5/1996 | ............ H01M/2/08 |
| JP | 08-167405 | | 6/1996 | |
| JP | 09-050794 | | 2/1997 | |

* cited by examiner

Primary Examiner—Carol Chaney
Assistant Examiner—Dah-Wei Yuan
(74) Attorney, Agent, or Firm—Jordan and Hamburg LLP

(57) ABSTRACT

After a negative electrode current collector has been inserted into an insertion hole therein, a resin sealing element and negative electrode terminal plate are successively inserted into an aperture of a battery casing, and the aperture rim of battery casing is then bent inwards and crimped to seal aperture of battery casing. Sealing element is accommodated within battery casing in an arrangement facing negative electrode terminal plate, with resin injection gate corresponding to resin injection port of metal molds during resin molding thereof positioned at the aperture end of battery casing.

10 Claims, 4 Drawing Sheets

SEALING STRUCTURE FOR AN ALKALI BATTERY HAVING A GATE ON AN APERTURE SIDE OF A SEALING ELEMENT

The present invention relates to an alkali battery, which employs a strongly alkaline liquid as electrolyte and of which aperture of the battery casing is hermetically sealed by a sealing unit chiefly including resin.

BACKGROUND OF THE INVENTION

The typical construction of a cylindrical alkali battery, for example an alkali dry battery is as shown in FIG. 5, which shows a longitudinal cross-section thereof. Specifically, within a battery casing (positive electrode) 1 of cylindrical shape having a head with a positive electrode terminal 8 projecting at its upper end face and an ornamental label 2 stuck on to its outer circumferential surface, there are inserted pellets of positive electrode mixture 3 which are molded in cylindrical shape and consist of manganese dioxide and graphite added as conductive material. On the inside of this positive electrode mixture 3, there is poured in, separated by a separator 4, a gel-form zinc negative electrode 7 obtained by uniformly dispersing gelling agent and zinc alloy powder in an alkaline electrolyte in which is dissolved potassium hydroxide.

The aperture 1a of battery causing 1 is sealed as follows. In aperture 1a at the bottom of battery casing 1, a rod-shaped negative electrode current collector 10 made of brass is pressed into an insertion hole 9a and a resin sealing element (gasket) 9 on to which is fitted an insulating washer 11 made of metal is fitted thereon. Negative electrode current collector 10 is then covered in electrically contacting fashion by a negative electrode terminal plate 12 contacting its head 10a and a folded-back portion 9b formed on resin sealing element 9 is strongly pressed against negative electrode terminal plate 12 by bending and crimping inwards the edges of the bottom aperture of battery casing 1.

In the resin forming of sealing element 9, as shown in FIG. 6, a cavity 18 constituting a molding space for sealing element 9 is formed by mold assembly of lower metal mold 13, upper metal mold 14 and mandrel metal mold 17, and molten resin 20 passing through a resin passage 19a of annular transverse cross-section of resin injection nozzle 19 is poured into this cavity 18 through a resin injection port 18a formed in annular shape by upper metal mold 14, resin injection nozzle 19 and mandrel metal mold 17. When the resin 20 that has been injected has solidified, the mold assembly constituted by lower metal mold 13, upper metal mold 14 and mandrel metal mold 17 is broken open to obtain a sealing element 9 as described above.

FIG. 7 shows a sealing unit 21 assembled using a resin sealing element 9 formed by the molding steps described above. Sealing unit 21 is assembled by pressing in and inserting negative electrode current collector 10 from the open end on the opposite side to resin injection gate 9c corresponding to resin injection port 18a when molding, into insertion hole 9a in sealing element 9. Insulating washer 11 is then mounted by bringing it into contact with inner seat 9d and outer seat 9e, after which negative electrode terminal plate 12 is placed over insulating washer 11, by bringing its central portion into contact with and mounting it on head 10a of negative electrode current collector 10. In fitting this sealing unit 21 into aperture 1a of battery casing 1, when bending the bottom aperture 1a of battery casing 1 inwards, the folded-back portion 9b of resin sealing element 9 is strongly pushed on to negative electrode terminal plate 12 as shown by the arrow.

Due to their use of a strongly alkaline liquid which is an alkaline aqueous solution of high concentration and large ion conductivity even at low temperature as electrolyte, such alkali batteries are able to withstand severe loading, have large capacity, and excellent low-temperature characteristics, and as a result are employed in equipment where power such as in particular motor drive power is needed. On the other hand, the strongly alkaline liquid that is used as electrolyte, due to its high permeability, is subject to the problem that leakage tends to occur due to creeping. Accordingly, sealing of aperture 1a of battery casing 1 is performed by forcing negative electrode current collector 10 into the insertion hole 9a, setting its external diameter to a value larger than the hole diameter of insertion hole 9a of resin sealing element 9, and bending and strongly crimping the aperture rim of battery casing 1.

However, in the case of the prior art sealing unit 21 shown in FIG. 7, small cracks appear in the resin injection gate 9c when negative electrode current collector 10 is inserted into insertion hole 9a of sealing element 9 by forcing it in from one end aperture at the opposite side to resin injection gate 9c on molding, whilst piercing and breaking flash 9f of resin injection gate 9c that closes the aperture at the other end, thereby widening this by pushing outwards. Since the resin injection gate 9c where these cracks start is arranged in contact with the electrolyte, electrolyte permeates into the cracks.

Also, in the case of high-temperature storage, heat cycle repetition, or prolonged storage at normal temperature, alkali batteries are subject to environmental stress cracking at locations subjected to excessive stress in a high-concentration alkaline aqueous solution (electrolyte) atmosphere. In particular, resin injection gate 9c, due to the fact that resin deterioration tends to occur there because of the presence of residual stress on resin injection when molding, tends to constitute a starting point for the environmental stress cracks referred to above which are generated and develop continuously. For example, where 6,6-nylon is employed as the raw material of the sealing element 9, it is inferred that the high-concentration alkaline aqueous solution is selectively absorbed into non-crystalline portions that are present in the crystalline layer, and cracks are created in the gaps between non-crystalline portions in the spherical crystals due to the joint action of external stress and force of the absorbed alkaline aqueous solution tending to wet and spread.

As a result, due to electrolyte that has permeated into the small cracks generated in the resin injection gate 9c creeping up by the creeping phenomenon between the negative electrode current collector 10 and the hole circumferential surface of insertion hole 9a of sealing element 9, cracks are continuously generated and developed originating from the resin injection gate 9c which acquires residual stress during resin molding. In this way, electrolyte permeates as the cracks develop and eventually leaks to the outside.

The present invention has been devised in view of the above problems, its object being to provide an alkali battery wherein the generation of environmental stress cracks can be reliably prevented by a simple construction and whereby excellent resistance to leakage can be obtained.

DISCLOSURE OF THE INVENTION

According to the present invention, in order to achieve the above object, in an alkali battery wherein, after a negative electrode current collector has been inserted into an insertion hole therein, a resin sealing element and negative electrode terminal plate are successively inserted into an aperture of a battery casing, and the aperture rim of said battery casing is then bent inwards and crimped to seal the aperture of said battery casing, said sealing element is accommodated within said battery casing in an arrangement facing said negative electrode terminal plate, with a resin injection gate corresponding to a resin injection port of a metal mold during resin molding thereof positioned at the aperture end of said battery casing.

With this alkali battery, since the resin injection gate corresponding to the resin injection port of the metal mold during resin molding of the sealing element is of a construction arranged at the aperture end of the battery casing and so not contacting the electrolyte, even if cracks are produced caused by residual stress during molding in the resin injection gate, electrolyte does not penetrate into these cracks, so the cracks do not develop to a sufficient degree to cause leakage of electrolyte. Excellent leakage-resistance performance can thereby be obtained.

Preferably in said invention the negative electrode current collector is forcibly inserted into an insertion hole passing through the central location of the sealing element to extend into the interior of the battery casing and is supported in a cantilevered manner, said insertion hole having a hole diameter smaller than the diameter of negative electrode current collector, and the sealing element has the resin injection gate at the aperture rim at the aperture end of said battery casing in said insertion hole.

In this way, since the metal mold for resin molding of the sealing element is of a construction in which a resin injection port is provided at the hole rim of the insertion hole in the middle of the cavity, resin molding of the sealing element is easy. The negative electrode current collector is forced in from the aperture in the vicinity of the resin injection gate at the insertion hole of the sealing element, and although tiny cracks are produced in the resin injection gate which has residual stress on molding, these cracks are generated in a location on the opposite side to the electrolyte in the sealing element, thus, in contrast to the conventional alkali battery, they do not constitute a starting point for the development of environmental stress cracks due to permeation of electrolyte. Apart from this, leakage due to penetration of electrolyte by creeping between the sealing element and the negative electrode current collector can be reliably prevented since the negative electrode current collector is forced into an insertion hole of the sealing element whose hole diameter is set to be smaller than the diameter of the negative electrode current collector.

Also, according to the invention, the sealing element may be provided with the resin injection gate in its face at the aperture edge side of the battery casing in a side part offset from its center.

As a result, since the resin injection gate is positioned in a side part of the sealing element remote from the insertion hole, there is no possibility of cracks being produced therein when the negative electrode current collector is forced into the insertion hole; consequently the negative electrode current collector can be inserted by smoothly forcing it into the insertion hole.

Furthermore, a construction is desirable in which, in the invention, the aperture on the side adjacent the electrolyte in the insertion hole of the sealing element has a curved hole rim chamfered in radiused shape. Consequently, when the negative electrode current collector is inserted by forcing it into the insertion hole of the sealing element, there is no possibility of excessive stress being applied to the aperture rim of the insertion hole adjacent the electrolyte, so the generation of environmental stress cracks at locations of the sealing element adjacent the electrolyte can be reliably prevented; a further improvement in leakage resistance is thereby achieved.

BEST MODE FOR CARRYING OUT THE INVENTION

Figure 1:
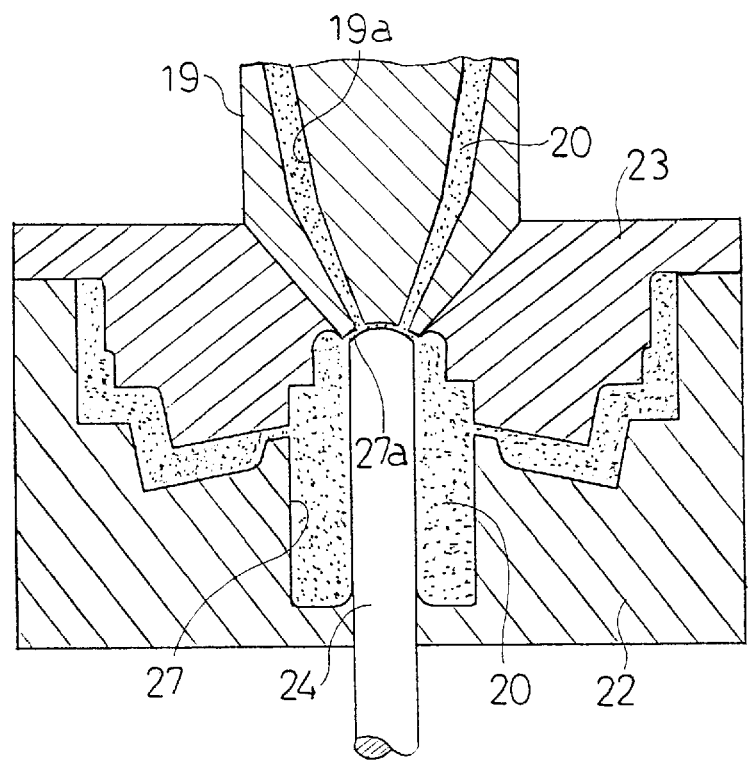
FIG. 1 is a cross-sectional view showing a molding step of a resin sealing element for an alkali battery according to an embodiment of the present invention.
Figure 2:
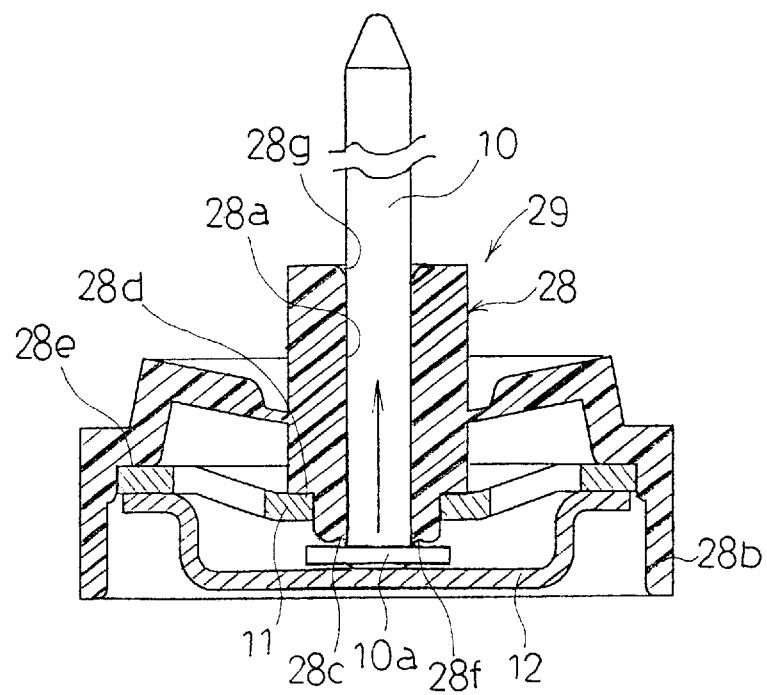
FIG. 2 is a cross-sectional view showing a sealing unit of the above alkali battery.
Figure 6:
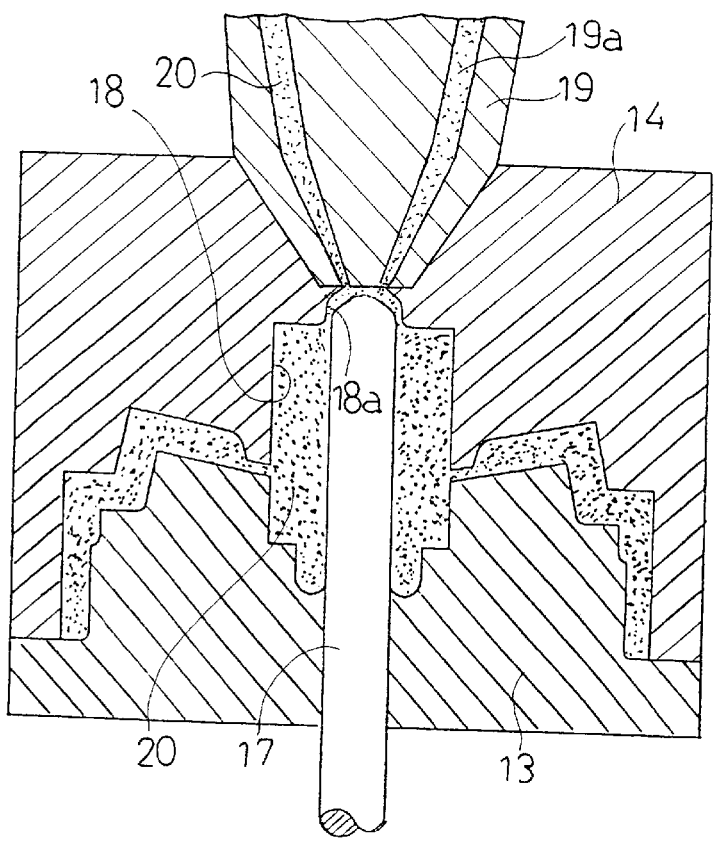
FIG. 6 is a cross-sectional view showing the molding step of a prior art alkali battery sealing element.

Preferred embodiments of the present invention are described below in detail with reference to the drawings. FIG. 1 is a cross-sectional view showing the step of molding a resin sealing element used in an alkali battery according to an embodiment of the present invention. In this Figure, a lower metal mold 22, upper metal mold 23 and mandrel metal mold 24 are assembled, a cavity 27 constituting a molding space for the sealing element being formed within these. Molten resin 20 passing through resin passage 19*a*, which is annular in cross-sectional shape, of resin injection nozzle 19 is injected through resin injection port 27*a* formed in annular shape by upper metal mold 23, resin injection nozzle 19 and mandrel metal mold 24. After the injected resin 20 has hardened, the mold assembly constituted by lower metal mold 22, upper metal mold 23 and mandrel metal mold 24 is broken open, to obtain a sealing element 28 as shown in FIG. 2. In the molding of this sealing element 28, as is clear by comparison with FIG. 6 which shows a prior art molding step, the resin injection port 27*a* of resin 20 injected by resin injection nozzle 19 into cavity 27 is provided in a middle region of sealing element 28 that is to be molded outside of the battery which does not contact the electrolyte.

FIG. 2 shows a cross-sectional view of a sealing unit 29 constructed using a sealing element 28 obtained by the molding step described above. In this Figure, sealing element 28 is provided with a resin casing 1 on the side of aperture 1*a* in insertion hole 28*a*, and negative electrode current collector 10 is inserted by being forced in as shown by the arrow from the one end aperture adjacent resin injection gate 28*c* in this insertion hole 28*a*. After mounting on to sealing element 28 with insulating washer 11 abutting inner seat 28*d* and outer seat 28*e*, negative electrode terminal plate 12 is mounted in a condition with its middle part contacting head 10*a* of negative electrode current collector 10, overlying insulating washer 11, thereby constituting sealing unit 29.

Figure 5:
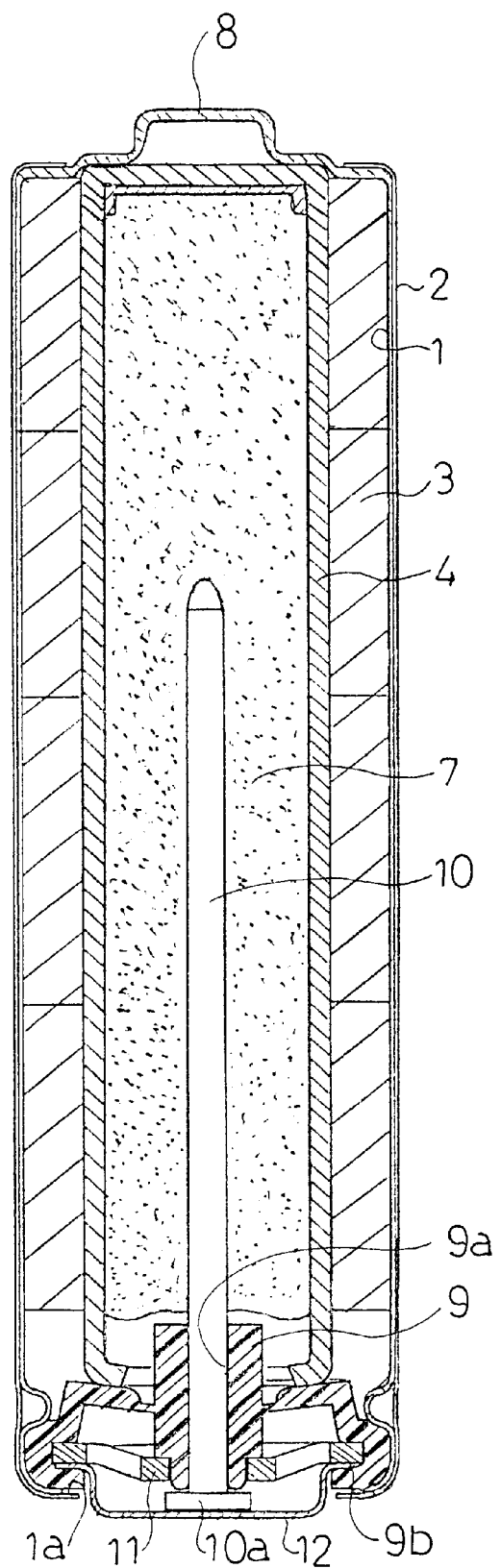
FIG. 5 is a longitudinal cross-sectional view showing the general construction of an alkali battery according to the present invention.

When sealing unit 29 assembled in this way is fitted into aperture 1*a* of battery casing 1 as shown in FIG. 5, and the rim of the bottom aperture of battery casing 1 is then bent inwards and crimped, the folded-back portion 28b of resin sealing element 28 is strongly pressed on to negative electrode terminal plate 12 as shown by the arrow, thereby sealing aperture 1a of battery casing 1 in liquid-tight manner.

When, in assembly of sealing unit 29, negative electrode current collector 10 is pressed into insertion hole 28a of sealing element 28 from one end aperture thereof corresponding to the resin injection gate 28c during molding, as a result of the insertion of negative electrode current collector 10 into insertion hole 28a whilst piercing and breaking flash 28f created during molding that closes one end aperture such as to push it outwards, tiny cracks are formed in resin injection gate 28c that retains residual stress from when it was molded. However, these cracks are generated in locations in sealing element 28 assembled in battery casing 1 which are on the opposite side to that of the electrolyte. Consequently, with an alkali battery wherein aperture 1a of battery casing 1 is closed in a sealed condition using the sealing unit 29 of FIG. 2, unlike the conventional alkali battery, the aforesaid cracks do not provide a starting point for environment stress cracks induced by permeation of electrolyte. Furthermore, the resin injection gate 28c where cracks are liable to be produced because of the residual stress during molding is of a construction in which it is positioned on the opposite side to the electrolyte in sealing element 28 and so does not contact the electrolyte. Even if cracks should be produced, such cracks cannot develop to the extent of permitting leakage of electrolyte by permeation of electrolyte as happens in a conventional battery; thus this battery has excellent leakage-resistance performance.

Furthermore, since the other-end aperture on the side that contacts the electrolyte in the insertion hole 28a of sealing element 28 is constituted by a curved hole rim 28g chamfered in radiused fashion, when negative electrode current collector 10 is inserted by forcing it into insertion hole 28a of sealing element 28, there is no possibility of excess stress being applied to the other-end aperture of insertion hole 28a that contacts the electrolyte. Leakage-resisting performance can therefore be further raised since occurrence of environmental stress cracks at locations of the sealing element 28 contacting the electrolyte can be reliably prevented.

Figure 3:
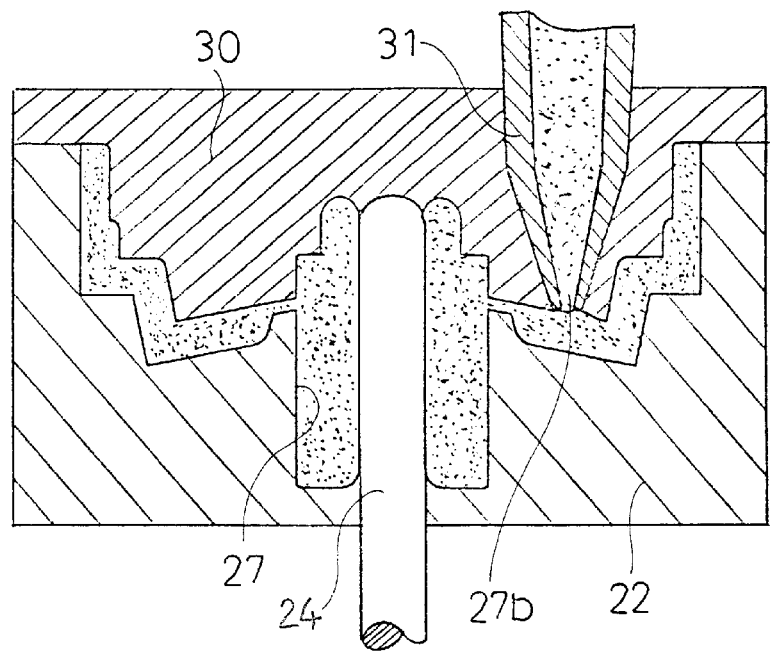
FIG. 3 is a cross-sectional view showing a molding step of a resin sealing element of an alkali battery according to another embodiment of the present invention.

FIG. 3 is a cross-sectional view showing the process of molding a resin sealing element used in an alkali battery according to a further embodiment of the present invention. In this Figure, lower metal mold 22 and mandrel metal mold 24 are the same as in the case of FIG. 1. Upper metal mold 30, together with lower metal mold 22 and mandrel metal mold 24, forms a cavity 27 of the same shape as in FIG. 1. However, in contrast to the cavity that is formed in annular shape in the middle position in FIG. 1, the resin injection port 27b of this cavity 27 in FIG. 3 is formed at a side location. Accompanying this, resin injection nozzle 31, which is of ordinary configuration, fits into upper metal mold 30 and is arranged such that resin 20 can be injected into cavity 27 through resin injection port 27b from this resin injection nozzle 31. It should be noted that resin injection ports 27b of cavity 27 could be formed at a plurality of side locations.

Figure 4:
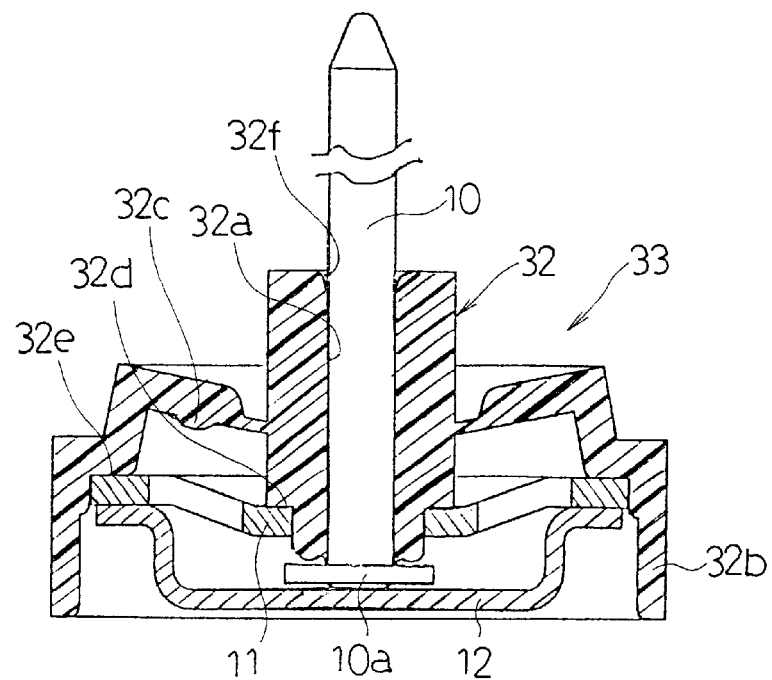
FIG. 4 is a cross-sectional view showing a sealing unit of the above alkali battery.

FIG. 4 shows a cross-sectional view of a sealing unit 33 constituted using a sealing element 32 obtained by the molding step described above. This sealing element 32 comprises an insertion hole 32a of the same shape as that of sealing element 28 of FIG. 2, a folded-back portion 32b, an inner seat 32a, an outer seat 32e and a curved hole rim 32f. The sole difference from sealing element 28 of FIG. 2 lies in that a resin injection gate 32c is provided on the inside face of the side part. Sealing unit 33 is constituted by mounting negative electrode current collector 10, insulating washer 11 and negative electrode terminal plate 12 on this sealing element 32 in the same way as in FIG. 2.

With an alkali battery wherein aperture 1a of battery casing 1 is sealed in sealing condition using this sealing unit 33, when negative electrode current collector 10 is forced into insertion hole 32a of sealing element 32, resin injection gate 32c is remote from insertion hole 32a, so insertion by forcing in negative electrode current collector 10 can be effected in a smooth fashion without production of cracks. Furthermore, since resin injection gate 32c where cracks are liable to be generated due to the presence of residual stress during molding, as in the embodiment described above, is of a construction positioned at the face on the opposite side of sealing element 32 to the electrolyte, so that it does not contact the electrolyte, just as in the case of the alkali battery of the embodiment described above, excellent resistance to leakage can be obtained.

Figure 7:
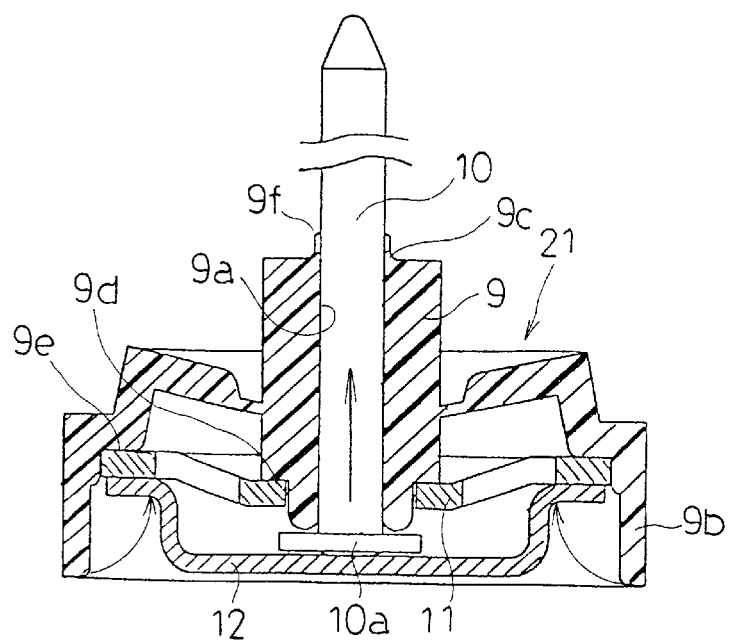
FIG. 7 is a cross-sectional view showing a sealing unit of the above alkali battery.

In order to ascertain the leakage-resistance performance of an alkali battery according to the above embodiments, the following tests were conducted. Resin sealing elements 28, 32 according to the embodiments were respectively molded by the molding steps of FIG. 1 and FIG. 3, using 6,6-nylon as thermoplastic resin, and sealing units 29, 33 were assembled respectively constituted as shown in FIG. 2 and FIG. 4 using these sealing elements 28, 32. Two types of alkali battery according to the present invention were manufactured using these sealing units 29, 33. As a comparative example, a conventional resin sealing element 9 was molded by the molding step of FIG. 6 likewise using 6,6-nylon and a sealing unit 21 was assembled constituted as shown in FIG. 7 using this sealing element 9. An alkali battery constituting a comparison example was then manufactured using this sealing unit 21.

These alkali batteries were placed in a heat cycling atmosphere in which the temperature was varied with a heat cycle of 12 hours from 0° to 80° and their respective leakage-resistance performances were evaluated. As a result, in the comparative example battery, axial cracks had developed to the extent of producing a defect by leakage of electrolyte, caused by entry of electrolyte into tiny cracks produced when the negative electrode current collector 10 in the resin injection gate 9c was formed in. In contrast, in the alkali batteries of the embodiments of the present invention, since the starting point for crack generation by permeation of electrolyte was eliminated, defects due to leakage did not occur. In the above test, it was found that leakage due to axial cracks could be effectively prevented if the ratio of the diameter of negative electrode current collector 10 with respect to the hole diameter of insertion hole 28a of sealing element 28 was set in the range 101% to 115%. It was also found that if this ratio was set to 100%, leakage occurred due to creeping of electrolyte between the sealing element 28 and negative electrode current collector 10.

It should be noted that the same benefits as described above could be obtained by employing, apart from the 6,6-nylon described above, vinyl chloride, polypropylene, soft polyethylene, or polyethylene terephthalate etc. as the material of sealing elements 28, 32. Furthermore, the same benefits as described above can be obtained by molding sealing elements 28, 32 by any of the methods: cold runner, semi-hot runner and hot runner.

As set forth above, in the alkali battery according to the present invention, a construction is adopted wherein the resin injection gate corresponding to the resin injection port of the metal mold during resin molding of the sealing element is located at the aperture end of the battery casing so that it does not contact the electrolyte. Even if cracks are produced due to residual stress on molding in the resin injection gate, such cracks are not in contact with electrolyte, and therefore they cannot develop to the extent of causing leakage of electrolyte; thus excellent leakage-resistance performance can be obtained.

What is claimed is:

1. A method of producing an alkali battery comprising the steps of:
   providing a battery casing having a first end, and a second end with an aperture;
   molding a sealing element having an insertion hole extending from a first side, which is an outer side, to a second side, which is an inner side, by injecting resin through an injection gate on the first side;
   inserting a negative electrode current collector into the insertion hole of the sealing element;
   inserting the negative electrode current collector and the sealing element in the aperture end of the battery casing;
   inserting a negative electrode terminal plate in the aperture end of the battery casing adjacent the negative electrode current collector; and
   bending a rim of the aperture of the battery casing, wherein the first side of the sealing element is closer to the aperture of the battery casing than the second side of the sealing element and the second side of the sealing element is in contact with an electrolyte.

2. The method of producing an alkali battery according to claim 1, wherein a diameter of the insertion hole of the sealing element is smaller than a diameter of the negative current collector, the negative electrode current collector is forcibly inserted into the insertion hole of the sealing element to extend into the battery casing and is supported in a cantilevered manner, and the injection gate is provided at an aperture rim of the battery casing.

3. The method of producing an alkali battery according to claim 1, wherein the injection gate is provided at a location offset from a center location of the sealing element.

4. A method of producing an alkali battery comprising the steps of:
   providing a battery casing having a first end, and a second end with an aperture;
   molding a sealing element having an insertion hole extending from a first side, which is an outer side, to a second side, which is an inner side, by injecting resin through an injection gate on the first side;
   inserting a negative electrode current collector into the insertion hole of the sealing element;
   inserting the negative electrode collector and the sealing element in the aperture end of the battery casing;
   inserting a negative electrode terminal plate in the aperture end of the battery casing adjacent the negative electrode current collector;
   bending a rim of the aperture of the battery casing inwards and crimping the rim to seal the aperture of the battery casing;
   providing a negative electrode gel in the battery casing;
   providing a positive electrode mixture in the battery casing;
   providing a separator between the negative electrode gel and the positive electrode mixture; and
   providing the insertion hole of the sealing element on a side contacting the negative electrode gel being constituted by a curved hole rim chamfered in radius shape, wherein the first side of the sealing element is closer to the aperture of the battery casing than the second side of the sealing element.

5. The method of producing an alkali battery according to claim 4, wherein the second side of the sealing element is in contact with an electrolyte.

6. An alkali battery comprising:
   a battery casing having a first end, and a second end with an aperture;
   a sealing element having an insertion hole;
   said sealing element having a first side and a second side;
   said sealing element being formed using an injection gate of the first side;
   a negative electrode current collector disposed in the insertion hole of the sealing element;
   said negative electrode current collector and said sealing element disposed in the aperture end of the battery casing;
   a negative electrode terminal plate disposed in the aperture end of the battery casing adjacent the negative electrode current collector; and
   said aperture end of the battery casing being bent inwards and crimped to seal the aperture of the battery casing, wherein the first side of the sealing element is closer to the aperture of the battery casing than the second side of the sealing element and the second side of the sealing element is in contact with an electrolyte.

7. The alkali battery according to claim 6, wherein a diameter of the insertion hole of the sealing element is smaller than a diameter of the negative current collector, the negative electrode current collector is forcibly inserted into the insertion hole of the sealing element to extend into the battery casing and is supported in a cantilevered manner, and the injection gate is provided at an aperture rim of the battery casing.

8. The alkali battery according to claim 6, wherein the injection gate is provided at a location offset from a center location of the sealing element.

9. An alkali battery comprising:
   a battery casing having a first end, and a second end with an aperture;
   a sealing element having an insertion hole;
   said sealing element having a first side and a second side;
   said sealing element being formed using an injection gate on the first side;
   a negative electrode current collector disposed in the insertion hole of the sealing element;
   said negative electrode current collector and said sealing element disposed in the aperture end of the battery casing;
   a negative electrode terminal plate disposed in the aperture end of the battery casing adjacent the negative electrode current collector;
   said aperture end of the battery casing being bent inwards and crimped to seal the aperture of the battery casing;
   a negative electrode gel disposed in the battery casing;
   a positive electrode mixture disposed in the battery casing;
   a separator disposed between the negative electrode gel and the positive electrode mixture; and
   the insertion hole of the sealing element on a side contacting the negative electrode gel being constituted by a curved hole rim chamfered in radius shape, wherein the first side of the sealing element is closer to the aperture of the battery casing than the second side of the sealing element.

10. The alkali battery according to claim 9, wherein the second side of the sealing element is in contact with an electrolyte.

* * * * *